(12) United States Patent
Mather et al.

(10) Patent No.: US 9,427,820 B2
(45) Date of Patent: Aug. 30, 2016

(54) THERMAL TORCH LEAD GAS DELIVERY METHODS AND RELATED SYSTEMS AND DEVICES

(71) Applicant: Hypertherm, Inc., Hanover, NH (US)

(72) Inventors: Jonathan Mather, Cornish Flat, NH (US); Liming Chen, Hanover, NH (US); Ross Angus Smith, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 415 days.

(21) Appl. No.: 13/904,734

(22) Filed: May 29, 2013

(65) Prior Publication Data

US 2014/0110381 A1    Apr. 24, 2014

Related U.S. Application Data

(60) Provisional application No. 61/716,065, filed on Oct. 19, 2012.

(51) Int. Cl.
 *B23K 10/00* (2006.01)
 *H05H 1/32* (2006.01)

(52) U.S. Cl.
 CPC ............ *B23K 10/006* (2013.01); *B23K 10/00* (2013.01); *H05H 1/32* (2013.01)

(58) Field of Classification Search
 CPC ...... B23K 10/006; B23K 10/00; H05H 1/32; H05H 1/34; H05H 1/36
 USPC ............ 219/121.55, 121.54, 121.57, 121.39
 See application file for complete search history.

(56) References Cited

U.S. PATENT DOCUMENTS

| | | | |
|---|---|---|---|
| 5,070,227 A | 12/1991 | Luo et al. | |
| 5,132,512 A | 7/1992 | Sanders et al. | |
| 5,160,821 A | 11/1992 | Oakley | |
| 5,278,388 A | 1/1994 | Huang | |
| 5,760,363 A | 6/1998 | Hackett et al. | |
| 6,335,505 B2 | 1/2002 | Billerot | |
| 7,605,341 B2 | 10/2009 | Higgins et al. | |
| 8,258,421 B2 | 9/2012 | Halvorsen et al. | |
| 2002/0185477 A1* | 12/2002 | Hardwick | B23K 10/00 219/121.54 |
| 2008/0210670 A1 | 9/2008 | Brandt et al. | |
| 2011/0155702 A1 | 6/2011 | Winn | |
| 2012/0018409 A1 | 1/2012 | Lindsay et al. | |
| 2012/0234803 A1* | 9/2012 | Liu | B23K 10/006 219/121.54 |

FOREIGN PATENT DOCUMENTS

| | | |
|---|---|---|
| CN | 101855039 | 10/2010 |
| CN | 102712057 | 10/2012 |
| DE | 19536150 A1 | 4/1997 |
| EP | 0257766 A2 | 2/1988 |

* cited by examiner

*Primary Examiner* — Mark Paschall
(74) *Attorney, Agent, or Firm* — Proskauer Rose LLP

(57) ABSTRACT

In some aspects, methods of initiating a plasma arc in a plasma cutting system can include providing a plasma gas supply lead line extending between a power supply and a plasma arc cutting torch, where the lead line has a first segment proximate to the power supply and a second segment proximate to the torch, and an in-line valve within the lead line between the first segment and the second segment; selectively closing the in-line valve to capture a static volume of gas in the first segment; establishing a decayable volume of gas in the second segment; and initiating the plasma arc when a pressure of the decayable volume reaches a pressure value within a predetermined range.

33 Claims, 6 Drawing Sheets

THERMAL TORCH LEAD GAS DELIVERY METHODS AND RELATED SYSTEMS AND DEVICES

RELATED APPLICATIONS

This application claims the benefit of U.S. Provisional Patent Application Ser. No. 61/716,065 filed Oct. 19, 2012, entitled "Thermal Torch Lead Gas Delivery Systems and Related Systems and Devices," the contents of which are hereby incorporated herein by reference in their entirety.

TECHNICAL FIELD

This disclosure relates generally to thermal cutting torches (e.g., plasma arc torches), and more specifically to plasma arc torch gas delivery methods and related systems and devices.

BACKGROUND

In some conventional plasma cutting systems (e.g., Hypertherm™ Long Life™ plasma arc cutting systems), a plasma arc is typically initiated during a pre-flow gas flow state and then switched to a cut-flow gas flow state for cutting a workpiece (e.g., a plate-like workpiece). This process is typically performed because the gas flow conditions used for proper and reliable plasma arc ignition are often different from those used during steady state cutting conditions. A valve assembly (e.g., an off-valve assembly) located relatively close to the torch is typically used to switch between ignition and steady state cutting. For example, the off-valve assembly typically includes a manifold and several valves (e.g., solenoid valves) to control plasma gas flow and shield gas flow to the torch. For either plasma gas flow or shield gas flow, there are typically two valves for controlling the gas flow. For example, one valve can be dedicated specifically for pre-flow gas flow, and the other valve can be dedicated specifically for cut-flow gas flow.

In some other plasma cutting systems (e.g., Hypertherm non-Long Life plasma cutting systems), substantially all of the gas control functions (i.e., gas control valves) are located in a power supply or a gas console to which the torch is connected, which can be located 20 to 150 feet away from the torch.

SUMMARY

In some aspects, a plasma cutting system can include a power supply, a torch, a plasma gas supply lead line that extends from a gas supply to the torch and includes a first segment proximate to the power supply and a second segment proximate to the torch and an in-line valve positioned in the lead line between the first segment and the second segment, and a controller programmable to control a position of the in-line valve, such that the in-line valve can be selectively closable by the controller to (a) capture a static volume of gas in the first segment and (b) establish a decayable volume of gas in the second segment.

Embodiments can include one or more of the following features.

The controller can be programmed to initiate the plasma arc when a pressure of the decayable volume reaches a pressure value within a predetermined range (e.g., in some cases, a lower value of the predetermined range can be approximately 9 psi and an upper value of the predetermined range can be approximately 50 psi). The plasma cutting system can also include a pressure sensor in the second segment of the plasma gas supply lead line. The first segment and the second segment can be a part of a hose that provides a pilot gas flow and cutting gas flow to the plasma cutting system. The controller can be programmed to change the pressure of the gas through the plasma gas supply line to the plasma arc torch in a controlled manner to establish a flow rate for cutting after initiation of the arc. In some cases, the controller can be programmed to terminate a plasma arc when a transient second pressure reaches a pre-determined pressure level. The plasma cutting system can also include a means for connecting a plurality of gas sources to the plasma arc torch through a plurality of plasma gas supply lines and a plurality of in-line solenoid valves.

In some aspects, a method of initiating a plasma arc in a plasma cutting system can include providing a plasma gas supply lead line extending between a power supply and a plasma arc cutting torch, where the lead line includes a first segment proximate to the power supply and a second segment proximate to the torch, and an in-line valve within the lead line between the first segment and the second segment; selectively closing the in-line valve, by a controller (i.e., using a controller), to capture a static volume of gas in the first segment; establishing a decayable volume of gas in the second segment; and initiating the plasma arc when a pressure of the decayable volume reaches a pressure value within a predetermined range.

In some embodiments, the initiating can be followed by changing one of the in-line valve or a supply valve to a first position thereby adjusting a flow of the gas to the plasma arc cutting torch; establishing a cutting pressure in the second segment after a transient pressure in the second segment increases to a cutting pressure level; and increasing a plasma arc current to a pre-determined level.

In some embodiments, the first segment and the second segment can be part of a hose that carries a pilot gas flow and cutting gas flow.

In some embodiments, the method can also include changing the pressure of the gas through the plasma gas supply lead line to the plasma arc cutting torch in a controlled manner to establish a gas flow rate for plasma cutting after initiation of the arc.

In some embodiments, the method can also include connecting a plurality of gas sources to the plasma arc cutting torch through a plurality of plasma gas supply lines, each plasma gas supply line having an in-line solenoid valve.

In some embodiments, the method can also include controlling the in-line valve with a digital signal processor that provides an output to the in-line valve, such that the in-line valve is controlled based on the output from the digital signal processor.

In some embodiments, a first position of the in-line valve is open and a second position of the in-line valve is closed, and the method can also include measuring a first time for the pressure in the second segment to reach a proportion of a set value for a first known length and inner diameter of the gas in the plasma gas supply lead line; measuring a second time for the pressure in the second segment to reach a proportion of a set value for a second known length and inner diameter of the plasma gas supply lead line; and calculating a length of the plasma gas supply lead line based on the difference between the second time and the first time, where the difference between the second time and the first time is proportional to the difference between the amount of gas in the second known length and the first known length of the plasma gas supply lead line.

In some embodiments, the method can also include changing the in-line valve to a first position thereby increasing a flow of the gas to the plasma arc cutting torch such that a transient pressure in the second segment increases prior to pressure dissipation through a plasma chamber of the plasma arc cutting torch; and igniting the plasma arc cutting torch when the transient pressure in the second segment reaches a value within the predetermined range.

In some aspects, a method for operating a plasma torch system, where the plasma torch system includes a plasma power supply coupled to a torch by a lead line, an in-line valve located in the lead line, and a section of the lead line between the in-line valve and the torch defines an off-valve hose segment, can include supplying a gas to the torch through the lead line; selectively closing the in-line valve to establish a decayable volume of gas in the off-valve hose segment; and initiating a plasma arc in the torch when a pressure of the gas at the torch reaches a pressure value within a predetermined range by: enabling a pressure of a volume of gas captured between the in-line valve and the torch to dissipate to the pressure value; or opening the in-line valve to release a volume of gas trapped between an upstream regulator valve and the in-line valve, and enabling a pressure of the gas in the off-valve segment to increase to the pressure value.

In some embodiments, the method can also include closing the in-line valve to allow a pressure of a volume of gas captured in the off-valve hose segment to decay at a selected rate while ramping down a plasma arc current in conjunction with the decaying pressure.

In some embodiments, the method can also include changing the pressure of the gas through the plasma gas supply line to the torch in a controlled manner to establish a flow rate of gas for cutting after initiation of the arc.

In some embodiments, the initiating also includes changing one of the in-line valve or a supply valve to a first position thereby adjusting the flow of the gas to the torch; establishing a cutting pressure when a transient second pressure increases to a cutting pressure level; and increasing an arc current to a pre-determined level. In some cases, a lower pressure value of the predetermined range can be about 9 psi and an upper pressure value of the predetermined range can be about 50 psi.

In some embodiments, the method can also include connecting a plurality of gas sources to the plasma arc torch through a plurality of plasma gas supply lines each having a dedicated in-line solenoid valve.

In some embodiments, the method can also include controlling the in-line valve with a digital signal processor that provides an output to the in-line valve, such that the in-line valve is controlled based on the output from the digital signal processor.

In some aspects, a method for initiating a plasma arc in a plasma arc torch can include flowing a plasma gas to the plasma arc torch through a plasma gas supply line and an in-line valve within the plasma gas supply line in a first position, thereby generating a first pressure in a segment of the plasma gas supply line between the in-line valve and the plasma arc torch; changing the in-line valve to a second position to adjust the flow of the plasma gas to the plasma arc torch and generating a second pressure that varies over time in the segment between the in-line valve and the plasma arc torch; and initiating a plasma arc when the varying second pressure reaches a pressure value within a predetermined range.

In embodiments, the method can also include increasing the pressure of the plasma gas through the plasma gas supply line to the plasma arc torch in a controlled manner to a cutting flow amount after initiation of the arc.

In some embodiments, the initiating can also include increasing an arc current to a pre-determined level; changing the in-line valve to a first position thereby adjusting the flow of the plasma gas to the plasma arc torch; and establishing a cutting pressure when the second pressure increases to a stable cutting pressure level. In some cases, a lower value of the predetermined range can be approximately 9 psi and an upper value of the predetermined range can be approximately 50 psi.

In some embodiments, the first position of the in-line valve is open and the second position of the in-line valve is closed, and the method can also include measuring a first time for the second pressure to reach a proportion of a set value for a first known length and inner diameter of the plasma gas supply line; measuring a second time for the second pressure to reach a proportion of a set value for a second known length and inner diameter of the plasma gas supply line; and calculating a length of the plasma gas supply lead line based on the difference between the second time and the first time, wherein the difference between the second time and the first time is proportional to the difference between the amount of gas in the second known length and the first known length of the plasma gas supply lead line.

In some embodiments, the method can also include connecting a plurality of gas sources to the plasma arc torch through a plurality of plasma gas supply lines each having a dedicated in-line solenoid valve.

In some embodiments, the method can also include controlling the in-line valve with a digital signal processor that provides an output to the in-line valve, such that the in-line valve is controlled based on the output from the digital signal processor.

In some aspects, a method for initiating a plasma torch system that includes a plasma power supply coupled to a torch by a lead line, an in-line valve located in the lead line, and a section of the lead line between the in-line valve and the torch defining an off-valve hose segment, can include supplying a gas to the torch through the lead line; closing the in-line valve to establish a decayable volume of gas in the off-valve hose segment; and initiating a plasma arc in the torch while the in-line valve is closed.

In some embodiments, the method can also include connecting a plurality of gas sources to the torch through a plurality of lead lines each having an in-line solenoid valve.

In some embodiments, the method can also include controlling the in-line valve with a digital signal processor that provides an output to the in-line valve, such that the in-line valve is controlled based on the output from the digital signal processor.

In some embodiments, the initiating also includes changing the in-line valve to a first position adjusting the flow of the gas to the torch; establishing a cutting pressure when the transient pressure in the off-valve hose segment increases to a cutting pressure level; and increasing an arc current to a pre-determined level.

In some embodiments, the method can also include changing the pressure of the gas through the lead line to the torch in a controlled manner to establish a flow rate for cutting after initiation of the arc.

In some embodiments, a first position of the in-line valve is open and a second position of the in-line valve is closed, and the method can also include measuring a first time for a pressure in the off-valve hose segment to reach a proportion of a set value for a first known length and inner diameter of the lead line; measuring a second time for a pressure in the off-valve hose segment to reach a proportion of a set value for a second known length and inner diameter of the lead line; and calculating a length of the plasma gas supply lead line based on the difference between the second time and the first time, where the difference between the second time and the first time is proportional to the difference between the amount of gas in the second known length and the first known length of the plasma gas supply lead line.

Embodiments can include one or more of the following advantages.

In some aspects, the thermal torch lead gas delivery systems described herein can exhibit a lesser delay in effectively switching from arc ignition to cutting than is observed in some other torch systems, such as torch systems having substantially all of the gas control valves located in their power supply. For example, in such systems having all of the gas control valves located in their power supply, the large volume of the torch leads between the control valves and the torch can result in a delay (e.g., a significant delay) at the torch when gas flows are changed (e.g., changed from arc ignition gas flow to cutting gas flow).

In some cases, effectively controlling the gas flows within the torch leads using control valves in the power supply can be complicated by the fact that the volume of gas varies between different torches having different lead lengths. The variable delays in gas pressures in torch systems having all of the gas control valves located in their power supply can impact both arc initiation and arc shut down processes, which can result in premature consumable damage and an increase in misfires and starting irregularities. The delay in changing gas flow can be compounded when attempting to re-fire a torch after an ignition misfire, especially when using a hand torch because the pressure in the torch must typically first be bled down before a re-fire sequence can be attempted.

By arranging an in-line valve within the torch lead as described herein, these delay problems can be limited (e.g., in some cases, prevented). For example, in some cases, arranging a single in-line valve near the torch can reduce the volume of gas that must be expelled from the lead line during the transition between ignition and cutting. The reduction in volume between the valve and the torch can result in a reduction of delay in the time needed to effectively transition between ignition and cutting. Limiting the delay in adjusting the gas pressure, can result in plasma arc torch that is more reliable and easier to operate than some other torch systems.

Further, by reducing the delay in transitioning between arc ignition and cutting, the single valve gas delivery systems described herein can help to provide better control of the gas flow close to the torch and enable changes in gas pressure within the torch (e.g., rapid changes of gas pressure) during arc initiation and arc shutdown than some other torch systems.

In some aspects, the gas delivery systems described herein can require fewer components (e.g., fewer gas valves and/or gas delivery lines) within the torch than some other torch systems, such as torch systems having multiple gas delivery lines. For example, some of the gas delivery systems described herein include one in-line valve (i.e., only one in-line valve) for delivering plasma gas and/or shield gas, which is typically integrated as part of a torch lead line. As a result of reducing the need for additional gas control components (e.g., an off-valve assembly), gas delivery systems described herein can help to lower the total cost of a torch system on which the gas delivery system is used. Additionally, by reducing the number of gas delivery valves and hoses included in a torch device, the gas delivery systems described herein can help to reduce system installation time because no additional off-valve assemblies typically need to be mounted and connected to the power supply.

In some aspects, the gas delivery systems described herein can be used to determine a length of a torch gas lead more easily than with some other torch systems. Additionally, the thermal torch lead gas delivery systems described herein can be used to detect gas leaks within a torch gas lead more easily than with some other torch systems.

Further, in some aspects, the thermal torch lead gas delivery systems described herein can be used in underwater cutting better than some other torch systems. For example, using the in-line valve, water that may be present in the torch can be purged by flowing gas through the off-valve hose and torch before initiating an arc for cutting.

DETAILED DESCRIPTION

In some aspects, thermal torch systems having torches that can be connected to torch control units by gas supply lines having in-line valves to selectively regulate the gas pressure within the torch resulting in a torch system that is more reliable and easier to control than some other torch systems.

Figure 1:
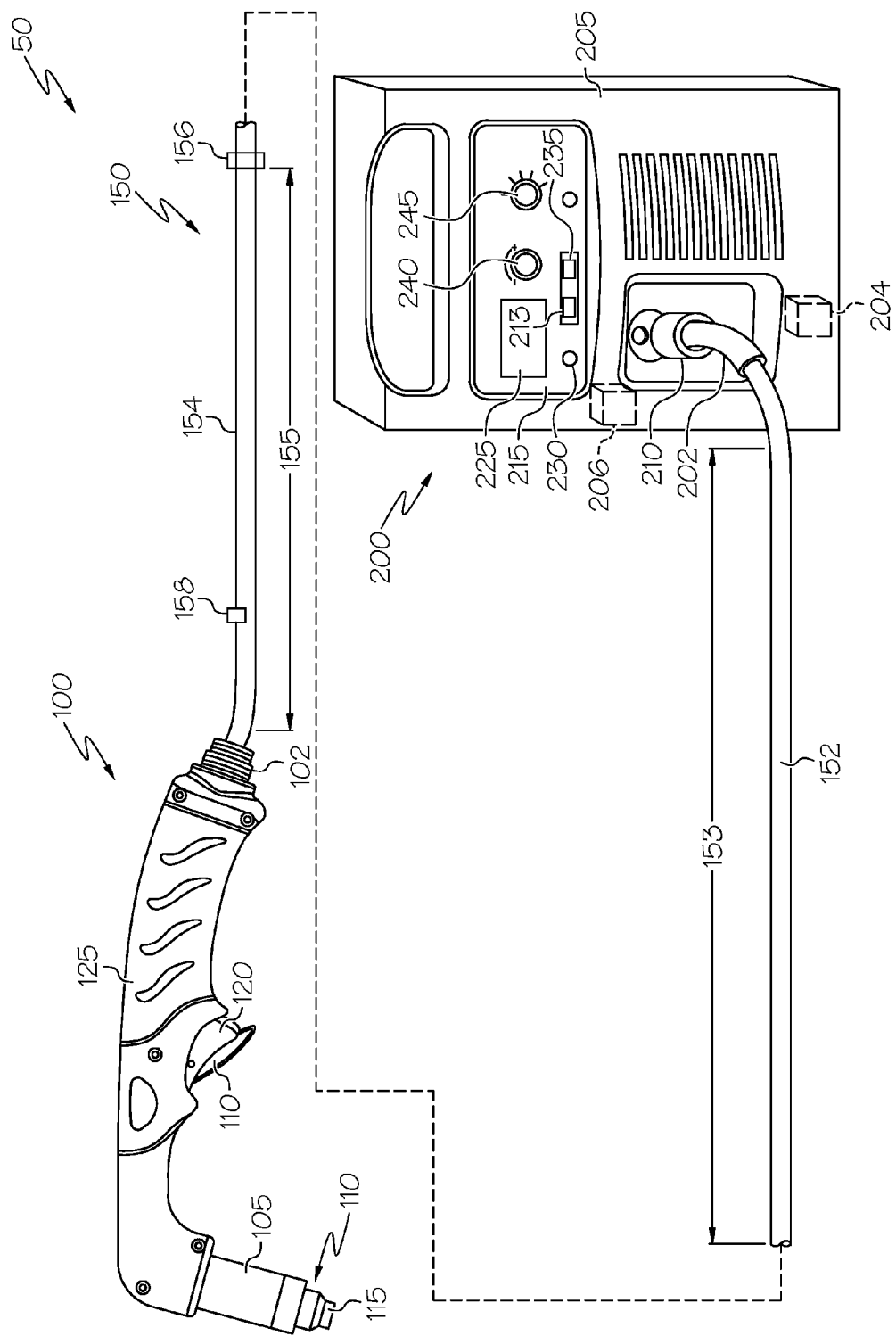
FIG. 1 is a side view of an exemplary plasma arc torch system having a gas supply lead line with an in-line gas valve for regulating gas flow to a torch.

Referring to FIG. 1, a thermal torch system (e.g., a plasma arc torch system) 50 can include a portable (e.g., a hand held) plasma arc torch 100 and a plasma arc cutting control system (e.g., a torch control unit) 200. The plasma arc torch 100 is connected to the torch control unit 200 by a generally flexible gas supply lead line 150 extending from a gas supply of the torch control unit 200 to the torch 100. The gas supply lead line 150 is used to deliver electrical current (e.g., electrical current to establish a plasma arc for cutting) and gas (e.g., plasma gas or shield gas) to the torch 100 for use. In some embodiments, the gas supply lead line 150 provides both a pilot gas flow and cutting gas flow to the torch 100.

The lead line 150 includes a first gas hose segment 152, a second gas hose segment (e.g., off-valve hose) 154 proximate to the torch 100, and a gas valve (e.g., an in-line valve) 156 disposed between and fluidly connecting the first gas hose segment 152 and the off-valve hose 154. The off-valve hose 154 typically has a length 155 that is less than a length 153 of the first gas hose segment 152. In some embodiments, as discussed herein, by locating the in-line valve 156 near the torch 100 (e.g., about 2 inches to about 12 feet away from the torch) and at a consistent distance away from the torch 100 (i.e., the in-line valve being substantially the same distance away from respective torches having different length lead lines), the length 153 of the first gas hose segment 152 can be varied between different torches (e.g., torches with different lead line lengths) without significantly impacting the timing of the critical gas transitions (e.g., during arc ignition) in the torch. For example, as discussed below, when the off-valve hose 154 is one consistent length throughout a variety of different lead lines having different total lengths (i.e., different first gas hose segments having different lengths), the same torch control unit and control settings can typically be used without requiring substantial changes to the plasma arc ignition sequence.

The off-valve hose 154 and the first gas hose segment 152 can be any of various lengths. For example, in some embodiments, the length 155 of off-valve hose 154 is typically less than 6 feet. However, the first gas hose segment 152 can be any of various lengths based on the needs of the user. For example, in some embodiment, the length 153 of the first gas hose segment 152 can be about 1 foot to about 100 feet (e.g., about 1 foot to about 75 feet, about 1 foot to about 50 feet, about 1 foot to about 25 feet. In the example shown, the length 153 of the first gas hose segment 152 can be about 20 feet to about 150 feet.

The lead line 150 (i.e., the first gas hose segments 152 and the off-valve hose 154) can be formed of any of various structurally and chemically suitable materials. For example, different rubber, plastic, metal braided, composite, or any of various combinations of these materials can be used. In the example shown, the first gas hose segments 152 and the off-valve hose 154 are made of nylon.

The in-line valve 156 is configured to regulate and control flow with the lead line 150, for example, to selectively limit permit gas from flowing from the first gas hose segment 152 into the off-valve hose 154 (e.g., during arc ignition or extinguishing sequences). In some cases, the in-line valve 156 can seal the first gas hose segment 152 from the off-valve hose 154 to create an enclosed volume of gas within the first gas hose segment 152.

The in-line valve 156 can include any of various types of valve devices that are suitable to limit gas flow within the lead line 150. In some embodiments, the in-line valve 156 can transition between a first, open position and a second, closed position to open and enclose the first gas hose segment 152. Alternatively or additionally, in some embodiments, the in-line valve 156 can proportionally open and close to create various, differently sized openings through which gas can pass. In some cases, such proportional valves can provide more flexibility and increase control when transitioning between arc ignition and steady state cutting and when setting gas pressures delivered to the torch.

Examples of such suitable valve devices can include globe valves, butterfly valves, ball valves, gate valves, check valves, and other types of valve devices. The in-line valve 156 is typically controlled electronically (e.g., controlled by the torch control unit 200) to regulate gas flow through the lead line 150. For example, in the example illustrated in FIG. 1, the in-line valve 156 is in the form of a two-way solenoid valve.

As shown in FIG. 1, in some embodiments, a pressure sensor 158 is disposed within the off-valve hose 154 (e.g., near the torch) between the in-line valve 156 and the torch 100. In some cases, the use of one or more pressure sensors can allow for more accurate pressure delivery to the torch 100 and also allow for better troubleshooting techniques. The pressure sensor 158 is configured to measure the gas pressure within the off-valve hose 154 and transmit gas pressure data to the torch control unit 200 (e.g., to a controller of the power supply). In some embodiments, a pressure sensor is additionally or alternatively disposed in the first gas hose segment 152.

The pressure sensor 158 can include any of various types of fluid pressure sensing devices including piezoresistive strain gauge devices, capacitive pressure sensing devices, electromagnetic pressure sensing devices, piezoelectric pressure sensing devices, optical pressure sensing devices, potentiometric pressure sensing devices, or various other types of pressure sensing devices. For example, the pressure sensor 158 can be a PSE540 pressure sensing device from SMC Corporation of America (Noblesville, Ind.).

During use, the plasma arc torch 100 can generate a plasma arc for cutting a workpiece when the plasma arc torch 100 is electrically and fluidly attached to the torch control unit 200 via the lead line 150. The plasma arc torch 100 generally includes a torch body 105 that defines a plasma gas flow path for directing a plasma gas to a plasma chamber in which a plasma arc is formed. An electrode (not shown) is disposed within the torch body 105 for generating the plasma arc. A nozzle (not shown) with a central exit orifice is disposed relative to the electrode at a distal end 110 of the torch body 105. The plasma arc torch 100 also includes a shield 115 disposed relative to an exterior surface of the nozzle at the distal end 110 of the torch body 105 for limiting exposure of the nozzle and electrode to molten workpiece material (e.g., splatter) or other debris. The torch 100 includes a connector 102 for connecting to the lead line 150. The connector 102 can be a permanent connection or can alternatively be a temporarily securable connector (e.g., a releasable coupling).

Portable plasma arc torches can be trigger-activated devices. That is, the torch 100 generates a plasma stream in response to operator activation of a trigger 120 disposed in the torch housing 125. Optionally, a displaceable safety member 130 can be disposed adjacent to the front surface of the trigger 120 to prevent the trigger 120 from inadvertently starting the plasma arc torch.

The plasma arc torch 100 can be attached to the torch control unit 200 at a connection area 210, for example, via a connector 202, which can include, for example, electrical connections and gas flow lines. The connectors 102, 202 can be flexible to allow easy maneuverability of the hand held plasma arc torch.

The torch control unit 200 includes an outer casing 205 that can house a power supply, a gas source (e.g., a gas pressure regulator) 206, and a controller 204. The controller 204 can typically be used to control the operation of the torch system 50 including, for example, control gas flow and electricity (e.g., plasma arc electricity) delivered to the torch 100. To do so, the torch control unit 200 is in communication (e.g., wired, electrical or wireless communication) with the various components of the torch 100 and the lead line 150. For example, the controller 204 can be in communication with the in-line valve 156, the one or more pressure sensors 158 disposed within the lead line 150, the torch electrode, and other components used to ignite the plasma arc and operate the torch for cutting.

To selectively adjust the gas pressure within the off-valve hose 154 (and within the torch), the controller 204 can be programmable to control a position of the in-line valve 156, such that the controller 204 can selectively adjust the in-line valve to one or more different configurations. For example, the controller 204 can move the in-line valve 156 to a closed position to capture a static volume of gas in the first gas hose segment 152 and to establish a decayable volume of gas in the off-valve hose 154. In some embodiments, as discussed below, the controller 204 is programmed to initiate the plasma arc when a pressure of the decayable volume reaches a pressure value within a predetermined range. As discussed further below, the controller 204 is programmed to change the pressure of the gas (e.g., in the torch) delivered through the gas supply lead line 150 to the plasma arc torch 100 in a controlled manner to establish a desired flow rate for cutting after initiation of the arc.

As discussed further below, alternatively or additionally, the torch system 50 described herein can also utilize the gas supply lead line 150 having the in-line valve 156 to extinguish a plasma arc based on the pressure in the off-valve hose 152. In some embodiments, the controller 204 is programmed to terminate a plasma arc when a transient second pressure in the off-valve hose (i.e., and in the torch 100) reaches a pre-determined pressure level. In some cases, the controller 204 is a processor (e.g., a digital signal processor).

The torch control unit 200 can include a control panel 215 that comprises a user activated switch 213 and a user interface 225 that can be used to operate the torch system 50. The control panel 215 can also include, for example, a fault light 230 (e.g., an LED indicator light), a current/pressure selection button 235, a dial 240, and/or a cutting type knob 245. Although certain features of the control panel 215 are shown using knobs and buttons, any type of mechanism can be used, for example, dials, knobs, buttons, slide bars, toggles, keys, touch screens, switches, or any combination thereof. A display disposed on the control panel 215 can provide a user with information about the portable plasma arc cutting system 200 and can have at least two modes. An operation mode can display operation data about the plasma arc cutting system 200, for example, cutting current, gas pressure, gas flow rate, cutting type, or any combination thereof. A service mode can display fault data about the plasma arc cutting system 200, for example, fault codes.

While the torch system 50 is illustrated and described generally as having only one gas supply lead line 150, other configurations are possible. For example, in some embodiments, the torch system 50 includes a means for connecting multiple gas sources to the plasma arc torch (e.g., through a plurality of plasma gas supply lines and a plurality of in-line solenoid valves).

While the systems and methods described herein have been generally described with reference to handheld type torches, other configurations are possible. For example, in some embodiments, the torch system includes other types of torch systems, such as automated, mechanized torches (e.g., torches connected to a gantry device).

Figure 2:
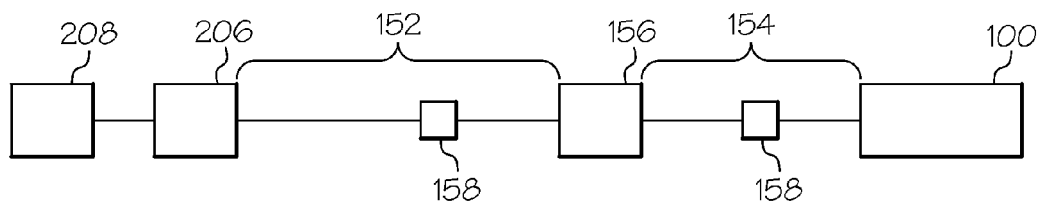
FIG. 2 is a schematic diagram of an exemplary plasma arc torch system having a gas delivery line with an in-line valve.

FIG. 2 is a schematic diagram of an exemplary hardware layout of a thermal torch system (e.g., the plasma arc torch system 50), which illustrates a gas flow path from a gas source to a plasma arc torch. Referring to FIG. 2, gas, such as plasma cutting gas (e.g., oxygen, nitrogen, or a blend of oxygen, nitrogen, or other gases) is provided from a gas source (e.g., a cylinder or compressor) 208 is regulated by a gas pressure regulator (or a proportion valve) 206 at a gas console (e.g., within the control unit 200) at a set pressure. For example, the gas pressure regulator 206 can be configured to provide gas to the lead line 150 at pressures ranging from about 50 psi to about 120 psi (e.g., about 60 psi to about 80 psi).

From the gas pressure regulator 206, the gas flows through the first gas hose segment 152, which can be any of various lengths (e.g., about 20 feet to about 150 feet long). As discussed above, a pressure sensor 158 can be arranged within the first gas hose segment 152. At the end of the first gas hose segment 152, the gas flows through the in-line valve 156, which can be in the form of a solenoid valve (e.g., a programmable, electrically controlled solenoid valve). As discussed above, the in-line valve 156 can open and close to limit or permit gas from flowing into the off-valve hose 154. From the in-line valve 156, gas flows to the off-valve hose 154 and subsequently onto the torch 100.

When closed during use, the in-line valve 156 creates a volume (e.g., a static volume) of gas within the first gas hose segment 152. When the in-line valve 156 is closed, the closure can also create a decayable volume of gas within the off-valve hose 154. That is, when the in-line valve 156 is closed, gas stops flowing into the off-valve hose 154 so that as the gas that was previously within the off-valve hose 154 flows out (e.g., through the torch 100), the volume of gas decreases (decays), as well as the gas pressure within the off-valve hose 154.

Based on this expected relationship between the closure of the in-line valve 156 and the pressure of the gas within the off-valve hose 154 (and in the torch 100), the in-line valve can be selectively opened and closed during use in order to vary the gas pressure within the off-valve hose 154. Varying the gas pressure within the off-valve hose can be used in several beneficial ways for operating a plasma arc torch.

Example Arc Ignition Method

In some aspects, the plasma arc torch system described herein can be used to execute several plasma arc ignition sequences. For example, in some embodiments, low pre-flow gas pressure conditions can be created during startup of the plasma arc torch within the off-valve hose by closing the in-line valve to interrupt a relatively high cut-flow pressure and the arc can be initiated as the pressure in the torch decays. For example, (briefly referring to FIG. 1) when a user attempts to operate the plasma torch 100, for example, by positioning the distal end 110 of the torch body 105 proximal to a workpiece to be cut, the user can then depress the trigger 120 for use. The depressed trigger 120 can then send a signal to the control unit 200 (e.g., the controller 204) to ignite a plasma arc. Once such an ignition signal is received, the controller 204 can operate the torch system 50 (e.g., the in-line valve 156 and the electrode) to execute one of the various plasma arc operation (e.g., ignition) sequences discussed herein.

Figure 3:
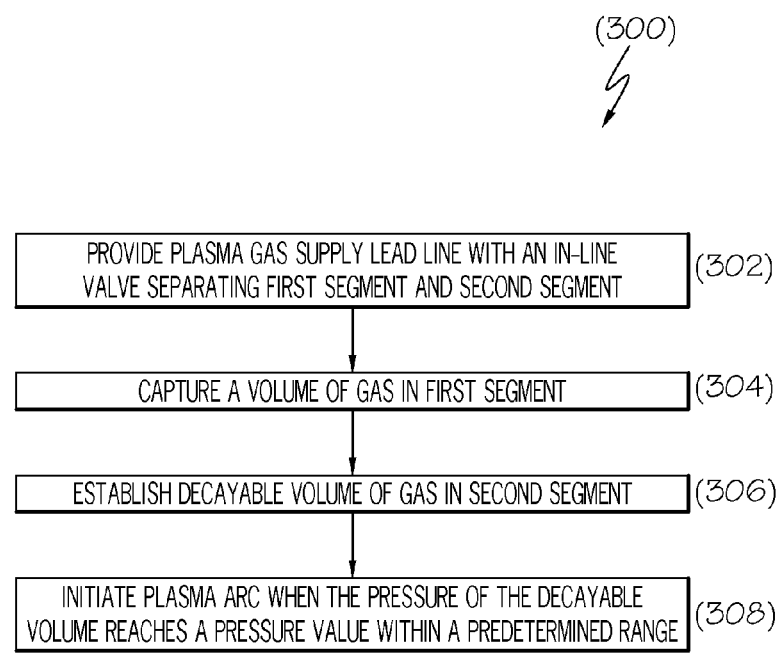
FIG. 3 is a flow chart describing an exemplary plasma arc ignition sequence using a lead line having an in-line valve.

Referring to FIG. 3, in one example plasma arc ignition method (300), a torch system having a gas supply lead line (e.g., the lead line 150) having an in-line valve (e.g., the in-line valve 156) is first provided (302). The in-line valve separates a first gas hose segment (e.g., the first gas hose segment 152) and a second gas hose segment (e.g., the off-valve hose 154). In some embodiments, the first gas hose segment and the second gas hose segment are components of a gas delivery hose that carries both a pilot gas flow and a cutting gas flow from a plasma torch control unit to a plasma torch.

Next, a volume of gas is substantially captured in the first gas hose segment (304). For example, in some embodiments, the in-line valve is closed (e.g., using a controller) which captures a static volume of gas (e.g., gas flowing from the gas regulator 206) within the first gas hose segment.

A decayable volume of gas is then established in the second gas hose segment (306). For example, in some embodiments, when the in-line valve is closed (e.g., as discussed above relative to capturing a static volume of gas in the first gas hose segment), gas stops flowing into the second gas hose segment, which results in the volume of gas within the second gas hose segment to decay as gas flows into the torch. As the decayable volume of gas within the second gas hose segment decreases, the pressure within the second gas hose segment (and therefore also in the torch) also decreases substantially proportionally to the volume.

Next, a plasma arc can be initiated (308). For example, once the pressure of the gas within the second gas hose segment decreases to a pressure value (e.g., a threshold pressure value) within a predetermined pressure range, the plasma arc can be ignited (e.g., using a controller of the power supply). The predetermined range of gas pressure in which the arc can be ignited can vary based on the type and size of the torch being used. For example, in some cases, a lower pressure value of the predetermined range is about 9 psi and an upper pressure value of the predetermined range is about 50 psi (e.g., about 9 psi to about 50 psi). However, the plasma arc can be ignited in other pressures as well.

In some embodiments, the method also includes changing the pressure of the gas through the plasma gas supply lead line to the plasma arc cutting torch in a controlled manner to establish a gas flow rate for plasma cutting after initiation of the arc. For example, after the plasma arc is ignited, the in-line valve can be opened so that gas can flow from the gas pressure regulator, through the first gas hose segment, through the second gas hose segment, and into the torch for plasma cutting. With the in-line valve re-opened, the pressure of the gas flowing through the torch can be increased to a pressure that is near or at the gas pressure delivered from the pressure regulator for cutting. However, in some cases, the gas pressure in the torch can lower than the gas pressure delivered from the pressure regulator, for example, as a result of the length of the gas delivery lead line.

In some cases, the method also includes connecting multiple gas sources to the plasma arc cutting torch through multiple plasma gas supply lines. Each plasma gas supply line can have its own dedicated in-line valve (e.g., in-line solenoid valve). Using multiple gas supply lines, multiple gases can be selectively delivered to the torch for use.

In some embodiments, the method also includes controlling the in-line valve with the processor (e.g., a digital signal processor) that provides an output to the in-line valve, such that the in-line valve can be controlled based on the output from the digital signal processor.

The method can also include (e.g., after the arc is initiated) changing one of the in-line valve or a supply valve to a first position (e.g., an open position) thereby adjusting a flow of the gas to the plasma arc cutting torch, establishing a cutting pressure in the second gas hose segment after a transient pressure in the second gas hose segment increases to a cutting pressure level, and increasing a plasma arc current to a pre-determined level (e.g., a cutting current). For example, in some embodiments, upon establishment of the pilot arc, the in-line valve can be opened to provide cut-flow gas pressures to the torch very quickly as a result of the increasing gas pressure in the lead line (e.g., the off-valve hose). Therefore, the arc can be ignited at a current that is less than the desired cutting current (e.g., about 20 A to about 50 A) while the pressure in the off-valve hose is less than the desired cutting pressure (e.g., about 9 psi to about 50 psi). Once the arc is ignited, the pressure and the plasma arc current can then be increased to the desired cutting parameters, for example a cutting current of about 50 A to about 400 A and a cutting pressure of about 50 psi to about 100 psi.

The method can also be used to estimate the length of the lead line. For example, in some embodiments, a first position of the in-line valve is an open position and a second position of the in-line valve is a closed position. In such embodiments, the method can further include measuring a first time for the pressure in the second segment to reach a proportion of a set value for a plasma gas supply lead line having a first known length and inner diameter. That is, the known length and inner diameter can be that of an example lead line to which the estimated lead line length can be compared. The method then includes measuring a second time for the pressure in the second segment to reach a proportion of a set value for a second known length and inner diameter of the plasma gas supply lead line. Using the measured first time and the measured second time, a length of the plasma gas supply lead line can be estimated (e.g., calculated) based on the difference between the second time and the first time. For example, the difference between the second time and the first time is typically proportional to the difference between the amount of gas in the second known length and the first known length of the plasma gas supply lead line.

In some embodiments, the method can further include changing the in-line valve to a first, open position thereby increasing a flow of the gas to the plasma arc cutting torch such that a transient pressure in the second gas hose segment increases prior to the pressure dissipation through a plasma chamber of the plasma arc cutting torch. Subsequently, the plasma arc cutting torch can be ignited when the transient pressure in the second segment reaches a pressure value within the predetermined range. For example, in some embodiments, if a pilot arc is not established (e.g., the arc misfires) before the pressure in the torch drops to a value that is too low (e.g., below the predetermined pressure range), the in-line valve can be re-opened (e.g., quickly re-opened) to refill the off-valve hose with gas and then closed to repeat the ignition method. For example, FIG. 4B depicts an example timing diagram illustrating such exemplary arc ignition sequences.

The arc ignition method 300 can also include one or more of additional steps or features as discussed herein with reference to the other example torch operation methods and sequences.

Figure 4A:
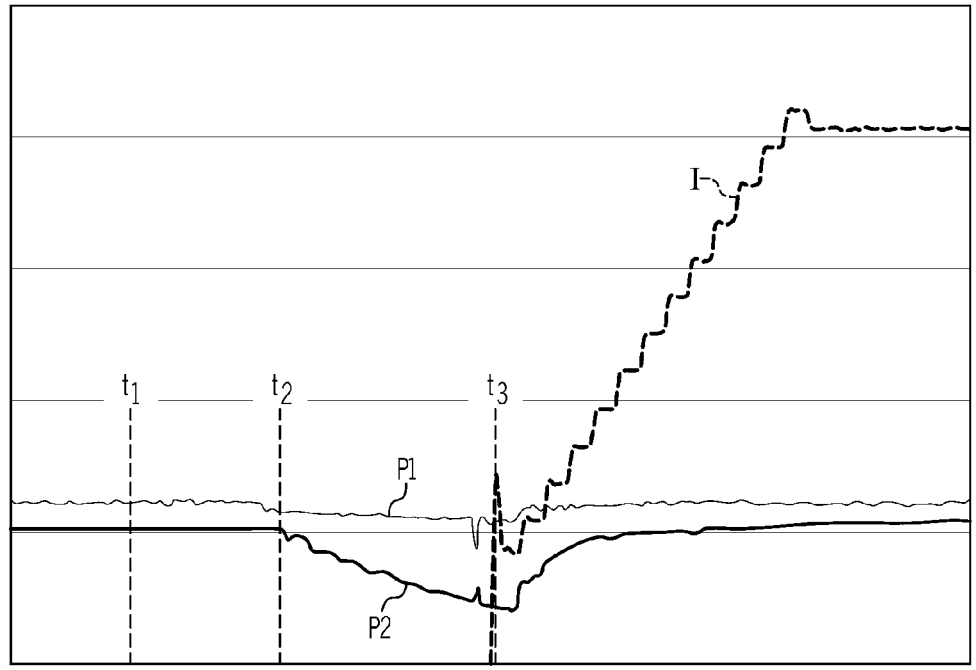
FIG. 4A is a timing diagram of gas pressures within a lead line and a plasma arc current during an exemplary plasma arc ignition sequence.
Figure 4B:
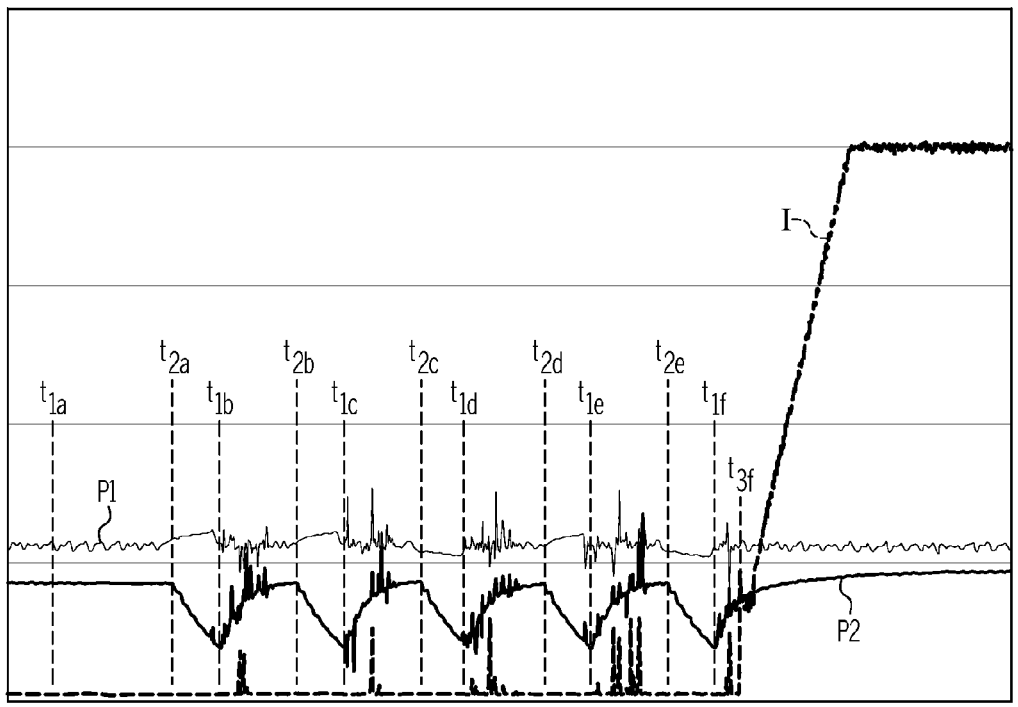
FIG. 4B is another timing diagram of gas pressures within a lead line and a plasma arc current during an exemplary plasma arc ignition sequence.

FIG. 4A is an example timing diagram illustrating an exemplary arc ignition sequence as discussed relative to method 300 discussed above. In particular, FIG. 4A illustrates the gas pressure within the first gas hose segment, $P_1$, the pressure in the off-valve hose, $P_2$, and the arc current, I. As depicted, at a time, $t_1$, both the valve at the gas console (e.g., gas pressure regulator) and the in-line valve are open. With both valves open, gas can be delivered to the torch at or near the pressure of the gas being released from the pressure regulator. As illustrated, in some cases, with both valves open, the pressure in the off-valve hose, $P_2$, is less than the pressure in the first gas hose segment, $P_1$, for example, as a result of head loss throughout the length of the gas delivery lead line.

At a time, $t_2$, the in-line valve is closed, and as a result, the pressure in the off-valve hose, $P_2$, begins to drop. Therefore, the pressure in the off-valve hose, $P_2$, (and also in plasma torch) also begins to drop. When the pressure in the off-valve hose, $P_2$, reaches a predetermined pressure value (e.g., a threshold pressure value), the controller (e.g., via an ignition console) can attempt to ignite an arc within the plasma torch, for example, by applying a current to the electrode. At a time, $t_3$, the arc can be ignited (reflected by the current, I, increase) and the in-line valve opens again to transition into cutting parameters. As a result of the in-line valve opening, the gas pressure in the off-valve hose, $P_2$, (and therefore also in the torch) quickly increases and substantially equalizes to its steady state pressure value at or near the pressure in the first gas hose segment, $P_1$. Additionally, after the in-line valve is open, arc current, I, is also increased to a predetermined set operating value (e.g., cutting current).

In some cases, it is possible that at the time, $t_3$, the off-valve pressure is too low to enable arc ignition, and the arc is not ignited. Therefore, if this occurs, the in-line valve can be opened again to increase the pressure in the off-valve hose, $P_2$, and the process described above can be repeated. For example, such a repeated process is illustrated in FIG. 4B in which the in-line valve opens at $t_{1a}, t_{1b}, t_{1c}, t_{1d}, t_{1e}, t_{1f}$ and closes at $t_{2a}, t_{2b}, t_{2c}, t_{2d}, t_{2e}$. In the example shown, arc ignition failed several times before the arc was successfully initiated at $t_{3f}$.

An advantage of igniting the plasma arc in this manner is that a reduced pressure in the off-valve hose, $P_2$, which is more ideal for arc ignition, can be provided without the use of a separate control circuit and additional gas hoses (e.g., a hose dedicated to only delivering gas at an ignition pressure). Additionally, these methods can be implemented without the long and variable delay that can be caused when pressure or flow adjustments are made in the control unit or gas console as a result of the relatively short, known length of the off-valve hose. In addition, the transition from the lower ignition pressure to the higher cutting pressure can typically be made much faster than if the change was made in the remote gas console or power supply.

Example Arc Ignition Method

Figure 5:
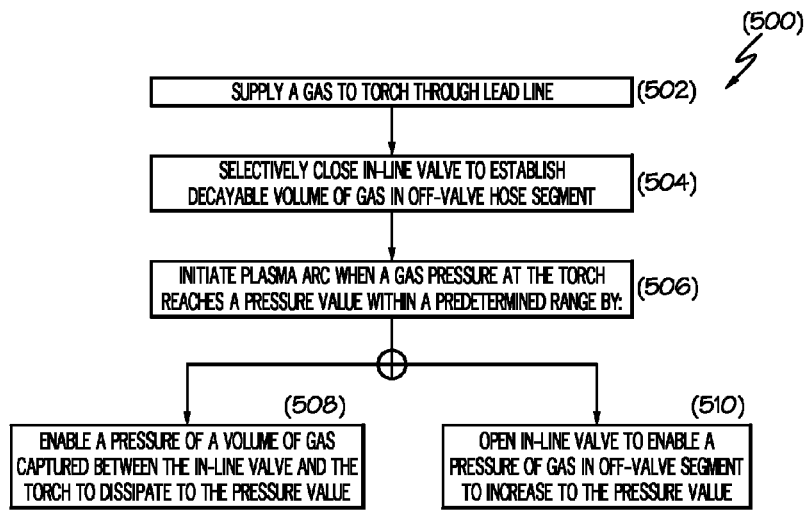
FIG. 5 is a flow chart describing another exemplary plasma arc ignition sequence using a lead line having an in-line valve.

FIG. 5 is a flow chart illustrating another exemplary plasma arc torch operating method (500). In some embodiments, the torch operating method (500) can be implemented using a plasma arc torch system (e.g., the plasma arc torch system 50 discussed above).

First, gas is supplied to a plasma torch (e.g., the torch 100) through the gas supply lead line (e.g., the lead line 150) (502). For example, the gas supply lead line can include an in-line valve (e.g., the in-line valve 156) that separates a first gas hose segment (e.g., the first gas hose segment 152) and a second gas hose segment (e.g., the off-valve hose 154). Using the gas supply lead line, gas (e.g., cutting gas) can be flowed from a gas source (e.g., via the control unit 200 and the gas regulator 206) and through the lead line to the torch.

Next, the in-line valve can be closed to establish a decayable volume of gas in the off-valve hose (504). In some cases, the in-line valve can be controlled with a processor, such as a digital signal processor (e.g., the controller 204) that provides an output to the in-line valve, such that the in-line valve is controlled based on the output from the digital signal processor. Once the in-line valve is closed, the plasma arc can subsequently be ignited (506). For example, the plasma arc can be ignited once the pressure in the off-valve hose falls to a pressure value within a predetermined range (508), similarly to the method 300 discussed above.

Alternatively, in some embodiments, the in-line valve can be closed so that substantially all of the plasma gas can escape the off-valve hose. Then, once substantially all of the gas has escaped the off-valve hose, the in-line valve can be opened to increase the pressure within the off-valve hose, for example, to increase to the pressure value within the predetermined pressure range for arc ignition (510). Briefly referring to FIG. 6, the arc can be ignited by selectively increasing the pressure within the off-valve hose, $P_2$, to a desired pressure value.

In some embodiments, initiating the plasma arc also includes changing one of the in-line valve or a supply valve in the pressure regulator to a first position (e.g., an open position) thereby adjusting the flow of the gas to the torch, establishing a cutting pressure when a transient second pressure increases to a cutting pressure level, and increasing an arc current to a pre-determined level.

The in-line valve can also be used to adjust the pressure of the gas delivered to the torch after arc ignition. For example, in some embodiments, the method further includes changing the pressure of the gas through the plasma gas supply line to the torch in a controlled manner to establish a flow rate of gas for cutting after initiation of the arc.

The predetermined range of gas pressure in which the arc can be ignited can vary based on the type and size of the torch being used. For example, in some cases, a lower pressure value of the predetermined range is about 9 psi and an upper pressure value of the predetermined range is about 50 psi.

In some examples, the method can also include connecting multiple gas sources to the plasma arc torch through multiple plasma gas supply lines each having a dedicated in-line solenoid valve. Using multiple gas supply lines, multiple gases can be selectively delivered to the torch for use.

The arc ignition method 500 can also include one or more of additional steps or features as discussed herein with reference to the other example torch operation methods and sequences.

Figure 6:
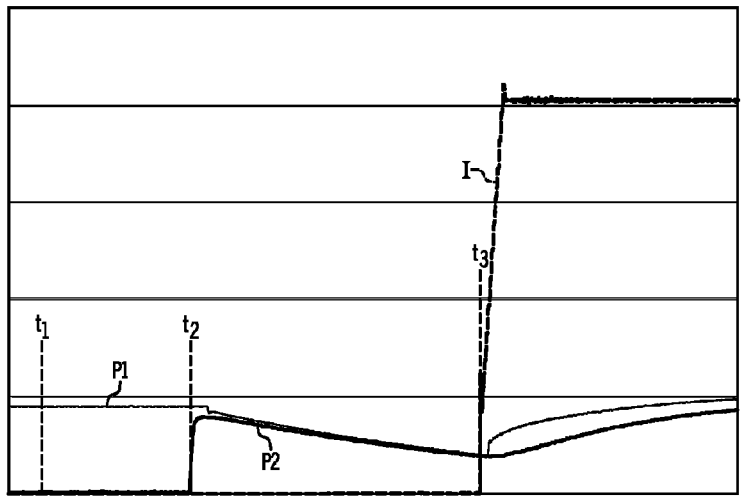
FIG. 6 is a timing diagram of gas pressures within a lead line and a plasma arc current during another exemplary plasma arc ignition sequence.

FIG. 6 is a timing diagram illustrating an exemplary arc ignition sequence as discussed relative to method 500 discussed above. In particular, FIG. 6 illustrates the gas pressure within the first gas hose segment, $P_1$, the pressure in the off-valve hose, $P_2$, and the arc current, I, during an arc ignition sequence according to method 500.

As depicted in FIG. 6, at a time, $t_1$, both the valve at the gas console and the in-line valve are closed. As a result, the gas trapped in the gas hose has a certain pressure, $P_1$, and the gas in the off-valve hose, $P_2$, is at approximately ambient pressure since the in-line valve limits gas from the gas console from entering the off-valve hose, $P_2$. At a time, $t_2$, the in-line valve is opened and gas begins to flow from the gas hose into the off-valve hose. As a result, the pressure in the off-valve hose, $P_2$, (and therefore also in the torch) begins to increase from atmospheric pressure. In a short period of time, the pressure in the off-valve hose, $P_2$, reaches a maximum value and begins to drop as the total volume of trapped gas in the lead (i.e., the gas in the gas hose and off-valve hose combined) flows out through the torch. When the pressure in the torch drops to a predetermined threshold value, the ignition console attempts to ignite the arc. At $t_3$, the arc is ignited and the gas valve at the gas console opens.

With the arc ignited and the gas valve at the gas console open, the arc current can be increased to a predetermined set value, for example, while the gas pressure is quickly increased to a desired cutting pressure. The value of the trapped pressure in the gas hose, $P_1$, and the timing of the opening of the valve in the gas console can be adjusted to optimize the timing of the desired pressure timing curve to increase torch operations (e.g., arc ignition reliability).

Other Example Arc Ignition Methods

Figure 7:
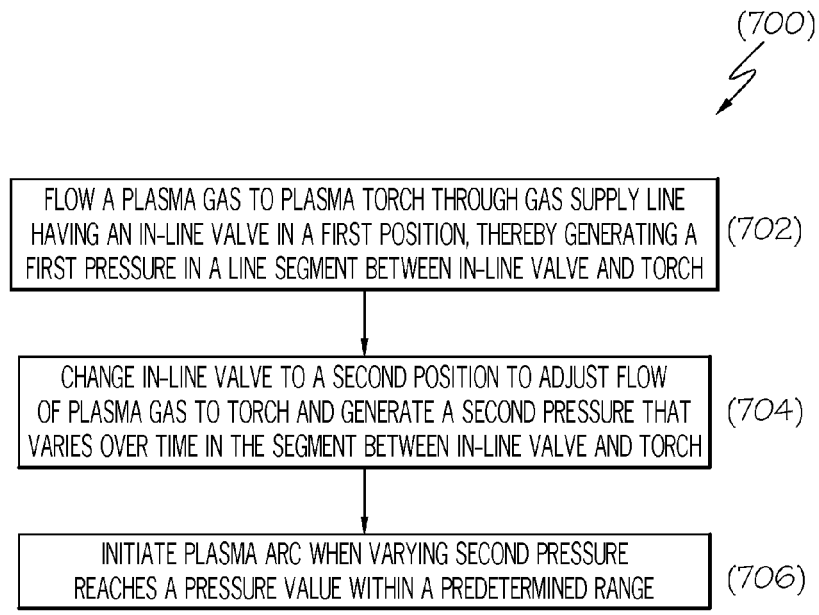
FIG. 7 is a flow chart describing another exemplary plasma arc ignition sequence using a lead line having an in-line valve.

FIG. 7 is a flow chart illustrating another exemplary plasma arc ignition method (700). In some embodiments, the arc ignition method (700) can be implemented using a plasma arc torch system (e.g., the plasma arc torch system 50 discussed above).

First, a plasma gas can be flowed to a plasma arc torch (e.g., the torch 100) through a plasma gas supply line (e.g., the lead line 150) having an in-line valve (e.g., the in-line valve 156) configured in a first, open position, thereby generating a first pressure in a segment of the plasma gas supply line between the in-line valve and the plasma arc torch (e.g., the off-valve hose 154) (702). For example, with the in-line valve open, the pressure within the off-valve hose can be at or near the same pressure of the gas being expelled from a pressure regulator into the first gas hose segment as a result of the off-valve hose being fluidly open and connected to the first gas hose segment.

Next, the configuration of the in-line valve can be changed to a second, closed position to adjust the flow of the plasma gas to the plasma arc torch (704). As a result of the closing in-line valve, a second pressure can be generated within the off-valve hose that varies over time. For example, once the in-line valve is closed, the pressure within the off-valve hose can decrease over time as a result of a decreasing volume of gas within the off-valve hose.

When the varying second pressure reaches a predetermined pressure value (e.g., a threshold pressure value) within a predetermined range, the plasma arc can be initiated (706). For example, when the second pressure reaches a desired pressure value within the predetermined range (e.g., about 9 psi to about 50 psi), the torch system controller can send signal the electrode to ignite (e.g., send an electrical current to the electrode).

The arc ignition method 700 can also include one or more of additional steps or features as discussed herein with reference to the other example torch operation methods and sequences.

Figure 8:
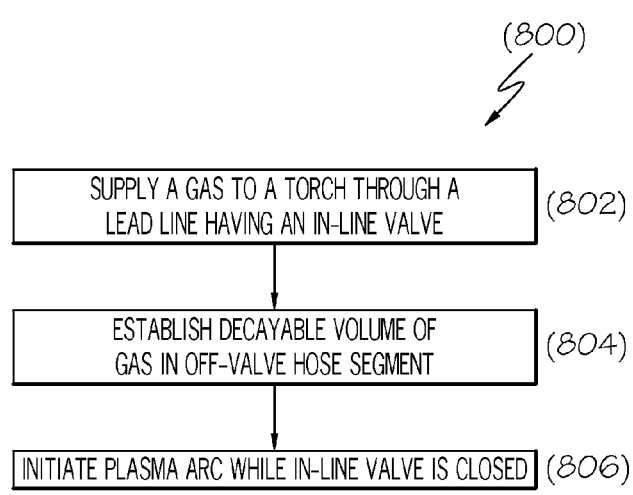
FIG. 8 is a flow chart describing another exemplary plasma arc ignition sequence using a lead line having an in-line valve.

FIG. 8 is a flow chart illustrating yet another exemplary plasma arc ignition method (800). In some embodiments, the arc ignition method (800) can be implemented using a plasma arc torch system (e.g., the plasma arc torch system 50 discussed above).

First, a gas (e.g., a plasma/cutting gas) is supplied to a torch (e.g., the torch 100) through a gas delivery lead line (e.g., the lead line 150) having an in-line valve (e.g., the in-line valve 156) (802). For example, gas can be provided from the gas console (or gas pressure regulator) 206 of a torch control unit 200.

Next, a decayable volume of gas can be established in an off-valve hose (e.g., the off-valve hose 154) (804). For example, the in-line valve can be closed to limit gas from flowing from the first gas hose segment 152 into the off-valve hose 154. As a result, the volume of gas in the off-valve hose begins to decrease (decay) as gas flows from the off-valve hose and subsequently into and out of the torch (e.g., the torch 100).

The plasma arc can then be initiated while the in-line valve is closed (806). For example, once the in-line valve is closed and the pressure within the off-valve hose is expected to drop to a pressure level (e.g., a threshold pressure) within a predetermined pressure range, the arc can be initiated. In some embodiments, when the second pressure reaches a desired pressure value within the predetermined range (e.g., about 9 psi to about 50 psi), the torch system controller can send signal the electrode to ignite (e.g., send an electrical current to the electrode).

The arc ignition method 800 can also include one or more of additional steps or features as discussed herein with reference to the other example torch operation methods and sequences.

Once the arc is initiated using one or more of the above-described methods, in some embodiments, the pressure of the plasma gas through the plasma gas supply line to the plasma arc torch can be increased in a controlled manner to a cutting flow amount after initiation of the arc. For example, with the arc initiated, the in-line valve can be opened (or left open (or opened further) in ignition methods where the in-line valve is open during ignition) so that the gas pressure within the off-valve hose (and therefore also in the torch) can increase (e.g., increased to a desired cutting pressure).

In some embodiments, the methods can also include increasing an arc current to a pre-determined level, changing the in-line valve to a first, open position to adjust the flow of the plasma gas to the plasma arc torch, and establishing a cutting pressure when the second pressure (e.g., the pressure within the off-valve hose) increases to a stable cutting pressure level.

The methods can also include connecting multiple gas sources to the plasma arc cutting torch through multiple plasma gas supply lines, each plasma gas supply line having an in-line solenoid valve. Using multiple gas supply lines, multiple gases can be selectively delivered to the torch for use.

In some embodiments, the method also includes controlling the in-line valve with processor (e.g., a digital signal processor) that provides an output to the in-line valve, such that the in-line valve can be controlled based on the output from the digital signal processor.

Extinguishing an Arc

In some embodiments, the pressure of the gas in the off-valve hose and the plasma arc current can be reduced to extinguish the plasma arc torch. For example, the in-line valve can be closed to allow a pressure of a volume of gas captured in the off-valve hose to decrease (decay) at a desired rate while also decreases (e.g., ramping down (e.g., ramping down in a step sequence) the plasma arc current in conjunction with the decaying pressure.

Figure 9:
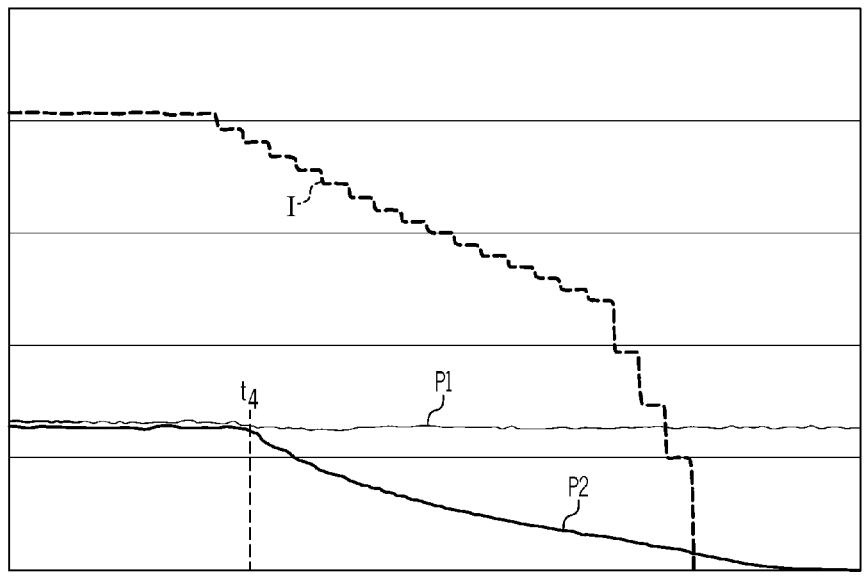
FIG. 9 is a timing diagram of gas pressures within a lead line and a plasma arc current during an exemplary plasma arc extinguishing sequence.

FIG. 9 is a timing diagram illustrating an exemplary arc extinguishing sequence using a plasma torch system (e.g., the torch system 50) having a torch (e.g., the torch 100) with a gas supply lead line (e.g., the lead line 150) having an in-line valve (e.g., the in-line valve 156). In particular, FIG. 9 illustrates a gas pressure within a first gas hose segment, $P_1$, a pressure in the off-valve hose, $P_2$, and an arc current, I.

As depicted, during use (e.g., a cutting operation), the pressure in the off-valve hose, $P_2$ is at or near the pressure within the first gas hose segment, $P_1$ because the in-line valve is open so that first gas hose segment and the off-valve hose are open and fluidly connected to one another. However, as mentioned above with reference to the example arc ignition processes, during steady state cutting operation, the pressure in the off-valve hose, $P_2$ can be less than the first gas hose segment, $P_1$ as a result of pressure loss (e.g., head loss) as the gas flows through the gas supply lead line. As illustrated, at $t_4$, the in-line valve can be closed so that the pressure in the off-valve hose, $P_2$, (and therefore the pressure in torch) beings to drop as the volume of gas in the off-valve hose decays. As shown, the arc current can be ramped down (e.g., stepped down at intervals) so that the arc current and the pressure in the off-valve hose, $P_2$ are reduced correspondingly to one another.

For example, in some embodiments, (briefly referring to FIG. 1) when a user releases the trigger 120 to stop a cutting operation, a controller (e.g., the controller 204) can signal the in-line valve 156 and the torch power supply to reduce the gas pressure entering the torch 100, as well as reduce the plasma arc current at the electrode. In some cases, the controller 204 can close the in-line valve 156 while substantially simultaneously decreasing the electrical current being sent to the electrode.

Torch Lead Length Sensing

In some aspects, a length of the gas supply lead line (e.g., a length of length 153 of the first gas hose segment 152) can be determined by monitoring (e.g., measuring) the pressure in the lead line (e.g., the pressure within the first gas hose segment 152) while filling or draining the lead line (e.g., the first gas hose segment 152) and subsequently comparing the rate of pressure change within the first gas hose segment to that of known predetermined lead lengths. Alternatively, a time duration for a measured pressure within the first gas hose segment to drop to a predetermined pressure can also be used for estimating lead length.

In particular, it is generally expected that torch lead lines having longer first gas hose segments will take longer time periods to pressurize to a desired pressure at or near the gas pressure being provided by the gas supply (e.g., the gas pressure regulator 206). Therefore, by monitoring the time needed to pressurize the first gas hose segment, the length can be estimated In some cases, the controller of the control unit can monitor the pressure within the first gas hose based on time and compare the measured pressure to known time-pressure profiles for lead lines having known first gas hose segments (e.g., by referencing a look-up table or database) to estimate a length of the lead line. Such length information can be taken into account by the controller when pressurizing the lead line (e.g., the first gas hose segment) for use (e.g., the ignition methods described herein). For example, in some cases, the length information can be used to determine desired pressure offsets (e.g., the pressure loss throughout the lead line) or time offsets for opening and closing the in-line valve to alter the pressure within the off-valve hose (and in the torch).

Additionally, by using the in-line valve 156 and pressure sensors 158 to determine first gas hose segment volume and corresponding length on a regular basis, the pressure offset desired to provide consistent torch pressures can be adjusted to account for variations, such as minor lead restrictions or leaks in addition to standard length changes.

In some embodiments, this process can be performed at regular intervals and tracked over time to alert or notify the user of gradual or sudden changes in gas hose volume characteristics. Such changes could serve as an indication that the gas hose is leaking or otherwise damaged.

For example, in some embodiments, one or more of the above-described torch operating or ignition methods can further include measuring a first time for the second pressure (e.g., the pressure within the off-valve hose) to reach a proportion of a set value for a first known length and inner diameter of the plasma gas supply line, and measuring a second time for the second pressure to reach a proportion of a set value for a second known length and inner diameter of the plasma gas supply line. Once the first time and the second time are measured, a length of the plasma gas supply lead line can be calculated based on the difference between the second time and the first time, where the difference between the second time and the first time is proportional to the difference between the amount of gas in the second known length and the first known length of the plasma gas supply lead line.

Figure 10:
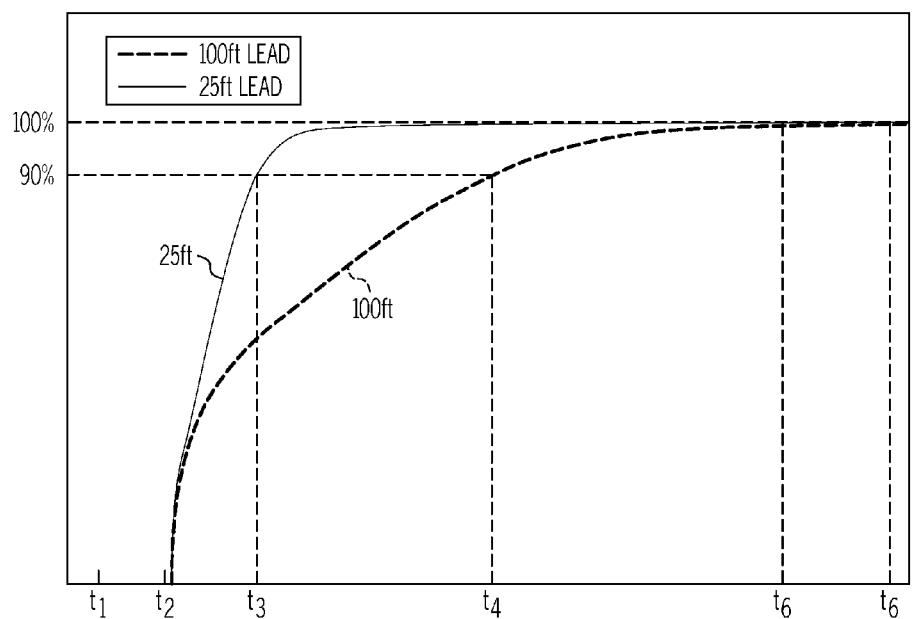
FIG. 10 is a timing diagram of gas pressures within torch lead lines having different lengths during exemplary pressurization test sequences.

For example, FIG. 10 illustrates test results in the form of a timing diagram that reflect how the overall length of torch lead affects the time needed to pressurize a first gas hose segment. In particular, a 25 ft first gas hose segment and a 100 ft first gas hose segment were pressurized using a gas console and the internal pressure of the first gas hose segment, $P_1$, increasing with respect to time was measured.

As depicted in FIG. 10, at a time $t_1$, both the valve at gas console and the in-line valve were closed so that the gauge pressure within the first gas hose segment, $P_1$, was 0. At a time $t_2$, the valve at gas console was opened while the in-line valve was kept closed. Once the valve at the gas console was opened, the internal pressure of the first gas hose segment, $P_1$, increased rapidly for both lead lengths. At a time $t_3$, the internal pressure of the 25 ft long first gas hose segment, $P_1$, reached 90% of the predetermined set value (e.g., the pressure of the gas pressure being produced by the gas console). However, as shown, for the 100 ft gas hose, it took until a time $t_4$ (i.e., which was longer than time $t_3$) for the internal pressure of the first gas hose segment, $P_1$, to reach 90% of the predetermined set value. The observed difference between $t_3$ and $t_4$ is expected to be due to the difference in gas hose volume capacity of the gas hose which is directly proportional to gas hose length. That is, since there is a greater volume within a longer gas hose, additional time is typically required to fill the greater volume with an amount of gas sufficient to raise the pressure. Therefore, by monitoring the time needed for the internal pressure of a first gas hose segment, $P_1$, for any given torch lead lenght to reach 90% of the predetermined set value, the torch gas hose length can be identified (e.g., estimated using an observed pressure profile). The observed test results for the above-described test are shown below in Table 1.

TABLE 1

| Gas Hose Size | Predetermined set pressure | Time to reach 90% of predetermined set pressure |
| --- | --- | --- |
| 25 ft long 0.165" ID | 45 psi | $t_3-t_2$ = 0.402 sec |
| 100 ft long 0.165" ID | 45 psi | $t_4-t_2$ = 1.510 sec |

Similar techniques can be used to identify other gas hose lengths, such as 50 foot and 75 foot hoses.

A torch length determination method can also be performed by monitoring the time difference for depressurizing a pre-pressurized gas hose by keeping valve at gas console closed and opening the in-line valve. However, in some cases, depressurization rates can be influenced by the types of consumables installed on the torch (e.g., consumable orifice sizes) so this method may need additional testing to adequately determine length when the consumable type is not known.

Additionally or alternatively, instead of simply identifying which known length of gas hose is likely installed, the pressure data could also be used provide a custom pressure offset based on the actual gas volume estimation. This could compensate for small restrictions or leaks and control the pressure in the torch more consistently over time and between different systems.

Torch Lead Leak Detection

In some embodiments, plasma arc torch systems (e.g., the torch system 50) having a gas supply lead line (e.g., the lead line 150) with an in-line valve (e.g., the in-line valve 156) can also be used for gas leak detection. For example, as illustrated in FIG. 10, at a time $t_5$, internal pressure of the first gas hose segment, $P_1$, reaches a steady state level for both the 25 ft gas hose and the 100 ft gas hose, even though the steady state pressure is reached much earlier for 25 ft gas hose, as explained above. If both valves are closed at time $t_5$, once steady state pressure is reached, the internal pressure of the first gas hose segment, $P_1$, can be measured after a period of time (e.g., at a time $t_6$), and can be compared to the value at time $t_5$. If the measured pressures at time $t_6$ and time $t_5$ are substantially the same, then it can likely be estimated that there are little or no leaks between the valve at the gas console and the in-line valve. However, if a drop in the internal pressure of the first gas hose segment, $P_1$, is observed between time $t_5$ and time $t_6$, then a leak may be present in the gas hose.

The terminology used herein is for the purpose of describing particular embodiments and is not intended to be limiting of the systems and methods described. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third, etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

While the systems and methods described herein have been particularly shown and described above with reference to exemplary embodiments thereof, it will be understood by those of ordinary skill in the art, that various changes in form and detail can be made without departing from the spirit and scope of the systems and methods described and defined by the following claims. Therefore, other embodiments are within the scope of the following claims.

What is claimed:

1. A method of initiating a plasma arc in a plasma cutting system, the method comprising:
   providing a plasma gas supply lead line extending between a power supply and a plasma arc cutting torch, the lead line comprising a first segment proximate to the power supply and a second segment proximate to the torch, and an in-line valve within the lead line between the first segment and the second segment;
   closing the in-line valve, by a controller, to capture a static volume of gas in the first segment;
   establishing a volume of gas in the second segment having a decaying pressure; and
   initiating the plasma arc when the decaying pressure of the volume of gas in the second segment reaches a pressure value within a predetermined range while the in-line valve remains closed.

2. The method of claim 1 wherein the first segment and the second segment are a part of a hose that carries a pilot gas flow and cutting gas flow.

3. The method of claim 1 further comprising changing the pressure of the gas through the plasma gas supply lead line to the plasma arc cutting torch in a controlled manner to establish a gas flow rate for plasma cutting after initiation of the arc.

4. The method of claim 1 further comprising connecting a plurality of gas sources to the plasma arc cutting torch through a plurality of plasma gas supply lines, each plasma gas supply line having an in-line solenoid valve.

5. The method of claim 1 further comprising controlling the in-line valve with a digital signal processor that provides an output to the in-line valve, such that the in-line valve is controlled based on the output from the digital signal processor.

6. The method of claim 1, wherein the initiating step is followed by the steps of:
   changing one of the in-line valve or a supply valve to a first position thereby adjusting a flow of the gas to the plasma arc cutting torch;
   establishing a cutting pressure in the second segment after a transient pressure in the second segment increases to a cutting pressure level; and
   increasing a plasma arc current to a pre-determined level.

7. The method of claim 1, wherein a first position of the in-line valve is open and a second position of the in-line valve is closed, further comprising:
   measuring a first time for the pressure in the second segment to reach a proportion of a set value for a first known length and inner diameter of the gas in the plasma gas supply lead line;
   measuring a second time for the pressure in the second segment to reach a proportion of a set value for a second known length and inner diameter of the plasma gas supply lead line; and
   calculating a length of the plasma gas supply lead line based on the difference between the second time and the first time, wherein the difference between the second time and the first time is proportional to the difference between the amount of gas in the second known length and the first known length of the plasma gas supply lead line.

8. The method of claim 1, further comprising the steps of:
   changing the in-line valve to a first position thereby increasing a flow of the gas to the plasma arc cutting torch such that a transient pressure in the second segment increases prior to pressure dissipation through a plasma chamber of the plasma arc cutting torch; and igniting the plasma arc cutting torch when the transient pressure in the second segment reaches a value within the predetermined range.

9. A plasma cutting system comprising:
a power supply;
a torch;
a plasma gas supply lead line extending from a gas supply to the torch and comprising a first segment proximate to the power supply and a second segment proximate to the torch;
an in-line valve positioned in the lead line between the first segment and the second segment; and
a controller configured to control a position of the in-line valve, the controller being programmed to execute a sequence comprising: i) closing the in-line valve to capture a static volume of gas in the first segment; ii) establishing a volume of gas in the second segment having a decaying pressure; and iii) initiating a plasma arc when the decaying pressure of the volume of gas in the second segment reaches a pressure value within a predetermined range while the in-line valve remains closed.

10. The plasma cutting system of claim 9 further comprising a pressure sensor in the second segment of the plasma gas supply lead line.

11. The plasma gas cutting system of claim 9 wherein the first segment and the second segment are a part of a hose that provides a pilot gas flow and cutting gas flow to the plasma cutting system.

12. The plasma cutting system of claim 9 wherein the controller is programmed to change the pressure of the gas through the plasma gas supply line to the plasma arc torch in a controlled manner to establish a flow rate for cutting after initiation of the arc.

13. The plasma cutting system of claim 12 wherein the controller is programmed to terminate a plasma arc when a transient second pressure reaches a predetermined pressure level.

14. The plasma cutting system of claim 9 further comprising means for connecting a plurality of gas sources to the plasma arc torch through a plurality of plasma gas supply lines and a plurality of in-line solenoid valves.

15. A method for operating a plasma torch system, the plasma torch system including a plasma power supply coupled to a torch by a lead line, an in-line valve located in the lead line and a section of the lead line between the in-line valve and the torch defining an off-valve hose segment, the method comprising:
supplying a gas to the torch through the lead line;
closing the in-line valve to establish a volume of gas having a decaying pressure in the off-valve hose segment; and
initiating a plasma arc in the torch when a pressure of the gas at the torch reaches a pressure value within a predetermined range by:
enabling a pressure of a volume of gas captured between the in-line valve and the torch to dissipate to the pressure value; or
opening the in-line valve to release a volume of gas trapped between an upstream regulator valve and the in-line valve, and enabling a pressure of the gas in the off-valve segment to increase to the pressure value.

16. The method of claim 15 further comprising the step of:
closing the in-line valve to allow a pressure of a volume of gas captured in the off-valve hose segment to decay at a selected rate while ramping down a plasma arc current in conjunction with the decaying pressure.

17. The method of claim 15 further comprising changing the pressure of the gas through the plasma gas supply line to the torch in a controlled manner to establish a flow rate of gas for cutting after initiation of the arc.

18. The method of claim 15, wherein the initiating step further comprises:
changing one of the in-line valve or a supply valve to a first position thereby adjusting the flow of the gas to the torch;
establishing a cutting pressure when a transient second pressure increases to a cutting pressure level; and
increasing an arc current to a pre-determined level.

19. The method of claim 18, wherein a lower pressure value of the predetermined range is about 9 psi and an upper pressure value of the predetermined range is about 50 psi.

20. The method of claim 15 further comprising connecting a plurality of gas sources to the plasma arc torch through a plurality of plasma gas supply lines each having a dedicated in-line solenoid valve.

21. The method of claim 15 further comprising controlling the in-line valve with a digital signal processor that provides an output to the in-line valve, such that the in-line valve is controlled based on the output from the digital signal processor.

22. A method for initiating a plasma arc in a plasma arc torch, the method comprising:
flowing a plasma gas to the plasma arc torch through a plasma gas supply line and an in-line valve within the plasma gas supply line in a first position, thereby generating a first pressure in a segment of the plasma gas supply line between the in-line valve and the plasma arc torch;
changing the in-line valve to a second position to adjust the flow of the plasma gas to the plasma arc torch and generating a second pressure that varies over time in the segment between the in-line valve and the plasma arc torch while the in-line valve is in the second position; and
initiating a plasma arc when the varying second pressure reaches a pressure value within a predetermined range.

23. The method of claim 22 further comprising the step of:
increasing the pressure of the plasma gas through the plasma gas supply line to the plasma arc torch in a controlled manner to a cutting flow amount after initiation of the arc.

24. The method of claim 22, wherein the initiating step further comprises the steps of:
increasing an arc current to a pre-determined level;
changing the in-line valve to a first position thereby adjusting the flow of the plasma gas to the plasma arc torch; and
establishing a cutting pressure when the second pressure increases to a stable cutting pressure level.

25. The method of claim 24, wherein a lower value of the predetermined range is approximately 9 psi and an upper value of the predetermined range is approximately 50 psi.

26. The method of claim 22, wherein the first position of the in-line valve is open and the second position of the in-line valve is closed, further comprising:
measuring a first time for the second pressure to reach a proportion of a set value for a first known length and inner diameter of the plasma gas supply line;

measuring a second time for the second pressure to reach a proportion of a set value for a second known length and inner diameter of the plasma gas supply line; and calculating a length of the plasma gas supply lead line based on the difference between the second time and the first time, wherein the difference between the second time and the first time is proportional to the difference between the amount of gas in the second known length and the first known length of the plasma gas supply lead line.

27. The method of claim 22 further comprising connecting a plurality of gas sources to the plasma arc torch through a plurality of plasma gas supply lines each having a dedicated in-line solenoid valve.

28. The method of claim 22 further comprising controlling the in-line valve with a digital signal processor that provides an output to the in-line valve, such that the in-line valve is controlled based on the output from the digital signal processor.

29. A method for initiating a plasma torch system including a plasma power supply coupled to a torch by a lead line, an in-line valve located in the lead line, and a section of the lead line between the in-line valve and the torch defining an off-valve hose segment, the method comprising:

supplying a gas to the torch through the lead line;

closing the in-line valve to establish a volume of gas having a decaying pressure in the off-valve hose segment;

initiating a plasma arc in the torch while the in-line valve is closed;

receiving an output from a digital signal processor at the in-line valve; and controlling the in-line valve based on the output from the digital signal processor.

30. The method of claim 29 further comprising connecting a plurality of gas sources to the torch through a plurality of lead lines each having an in-line solenoid valve.

31. The method of claim 29, wherein the initiating step further comprises the steps of:

changing the in-line valve to a first position adjusting the flow of the gas to the torch;

establishing a cutting pressure when the transient pressure in the off-valve hose segment increases to a cutting pressure level; and increasing an arc current to a pre-determined level.

32. The method of claim 29 further comprising changing the pressure of the gas through the lead line to the torch in a controlled manner to establish a flow rate for cutting after initiation of the arc.

33. The method of claim 29, wherein a first position of the in-line valve is open and a second position of the in-line valve is closed, further comprising:

measuring a first time for a pressure in the off-valve hose segment to reach a proportion of a set value for a first known length and inner diameter of the lead line;

measuring a second time for a pressure in the off-valve hose segment to reach a proportion of a set value for a second known length and inner diameter of the lead line; and calculating a length of the plasma gas supply lead line based on the difference between the second time and the first time, wherein the difference between the second time and the first time is proportional to the difference between the amount of gas in the second known length and the first known length of the plasma gas supply lead line.

* * * * *